US008560958B1

(12) United States Patent
Feng et al.

(10) Patent No.: US 8,560,958 B1
(45) Date of Patent: *Oct. 15, 2013

(54) SIGNAL NAVIGATION AND LABEL PROPAGATION IN BLOCK DIAGRAMS

(75) Inventors: Haihua Feng, Sherborn, MA (US); Ramamurthy Mani, Wayland, MA (US); Donald Paul Orofino, II, Sudbury, MA (US); John Edward Ciolfi, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/161,062

(22) Filed: Jun. 15, 2011

Related U.S. Application Data

(63) Continuation of application No. 11/881,345, filed on Jul. 25, 2007, now Pat. No. 7,975,235, which is a continuation of application No. 10/414,832, filed on Apr. 16, 2003, now Pat. No. 7,665,025.

(51) Int. Cl.
*G06F 3/00* (2006.01)

(52) U.S. Cl.
USPC ........... 715/764; 715/734; 715/737; 715/735; 715/854; 715/855

(58) Field of Classification Search
USPC .......................... 715/764, 734, 737, 854, 855
See application file for complete search history.

(56) References Cited

U.S. PATENT DOCUMENTS

| 4,868,785 | A | 9/1989 | Jordan et al. |
|---|---|---|---|
| 5,367,468 | A | 11/1994 | Fukasawa et al. |
| 5,408,603 | A * | 4/1995 | Van de Lavoir et al. ...... 715/763 |
| 5,801,687 | A | 9/1998 | Peterson et al. |
| 6,064,812 | A | 5/2000 | Parthasarathy et al. |
| 6,369,840 | B1 | 4/2002 | Barnett et al. |
| 6,453,450 | B1 | 9/2002 | Walter et al. |
| 6,771,287 | B1 | 8/2004 | Walker et al. |
| 6,862,030 | B1 | 3/2005 | Bachmann |
| 7,047,496 | B2 | 5/2006 | Nelles et al. |
| 7,408,560 | B2 | 8/2008 | Staples et al. |
| 2002/0024535 | A1 | 2/2002 | Ueno et al. |
| 2002/0199034 | A1 | 12/2002 | Beckett et al. |
| 2004/0133853 | A1 | 7/2004 | Poerner et al. |
| 2004/0174382 | A1 | 9/2004 | Staples et al. |
| 2004/0243363 | A1 | 12/2004 | Hillermeier |
| 2006/0036798 | A1 | 2/2006 | Dickey et al. |
| 2006/0064670 | A1 * | 3/2006 | Linebarger et al. ........... 717/106 |
| 2007/0006103 | A1 | 1/2007 | Zhang et al. |
| 2008/0066067 | A1 * | 3/2008 | Stimpson et al. ............. 718/100 |
| 2008/0086705 | A1 * | 4/2008 | Balasubramanian et al. .... 716/5 |
| 2009/0002371 | A1 * | 1/2009 | Linebarger et al. ........... 345/440 |

OTHER PUBLICATIONS

The MathWorks, Simulink, Dynamic System Simulation for MATLAB, Using Simulink Version 3, 1999.*

* cited by examiner

*Primary Examiner* — Ryan Pitaro
(74) *Attorney, Agent, or Firm* — Nelson Mullins Riley & Scarborough LLP

(57) ABSTRACT

A system and method that includes line connection navigation in a block diagram by highlighting connections through navigable blocks in the diagram, edit-time label propagation along connections and through navigable blocks that can propagate labels through their ports, API to define navigability between block ports, and displaying implied connections between blocks.

43 Claims, 14 Drawing Sheets

SIGNAL NAVIGATION AND LABEL PROPAGATION IN BLOCK DIAGRAMS

RELATED APPLICATIONS

This application is a continuation of U.S. patent application Ser. No. 11/881,345, filed Jul. 25, 2007, which is a continuation of U.S. patent application Ser. No. 10/414,832, filed Apr. 16, 2003, issued as U.S. Pat. No. 7,665,025 B2, the contents of which have been incorporated herein.

TECHNICAL FIELD

The present invention relates to signal navigation and label propagation in block diagrams.

BACKGROUND

Various classes of block diagrams describe computations that can be performed on application specific computational hardware, such as a computer, microcontroller, FPGA, and custom hardware. Classes of such block diagrams include time-based block diagrams such as those found within Simulink® from the MathWorks, Inc. Natick Mass., state-based and flow diagrams such as those found within Stateflow® from the MathWorks, Inc. Natick, Mass., and data-flow diagrams. A common characteristic among these various forms of block diagrams is that they define semantics on how to execute the diagram.

SUMMARY

In an aspect, the invention features a method including, in a block diagram model, tracing a signal connection through navigable blocks.

One or more of the following features can also be included. Tracing can be in response to a user request. Tracing can include displaying tracing results on a graphical user interface (GUI). Displaying can include highlighting the signal connection on the GUI. Displaying can include displaying implied signal connections on the GUI.

In embodiments, tracing can include providing an application program interface (API) for block in the block diagram model to specify how navigation occurs between inputs and outputs. The API further can include specification of how navigation occurs between the outputs and the inputs.

In another aspect, the invention features a method including in a block diagram edit-phase, propagating a signal label through navigable blocks.

One or more of the following features can also be included. Propagating can be in response to a user input. Propagating can include displaying the propagated signal label on a graphical user interface (GUI). Displaying can include showing signal labels on implied signal connections on the GUI.

In embodiments, tracing can include providing an application program interface (API) for block in the block diagram model to specify how navigation occurs between inputs and outputs. The API can include specification of how navigation occurs between the outputs and the inputs.

In another aspect, the invention features a method including in a block diagram model, displaying an implied signal connection.

One or more of the following features can also be included. Displaying can be in response to a user activating a hyperlink provided on a block that has an implicit signal connection with another block. Displaying can be in response to a user activating a hyperlink on a dialog of a block that has an implicit signal connection with another block.

Displaying can include highlighting blocks involved in the implied signal connection. Displaying can include automatically drawing lines between blocks that have implied signal connections.

In another aspect, the invention features a Graphical User Interface (GUI) for displaying results from a signal navigation including a first element that defines a highlighting contrast value for determining a contrast between a highlighted portion and a remainder of a block diagram model, and a second element that highlights non-navigable source blocks and non-navigable destination blocks.

One or more of the following features can also be included. The first element can include a command to enable a user to change the contrast. The first element can include a dialog box to enable a user to change the contrast.

In embodiments, the GUI can include a third element that highlights an entire signal path from its non-navigable source to its non-navigable destination, a fourth element that fades a remainder of the block diagram model so that a highlighted portion is easily identified, and/or a fifth element that enables a user to de-emphasize portions of the block diagram that are not highlighted.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
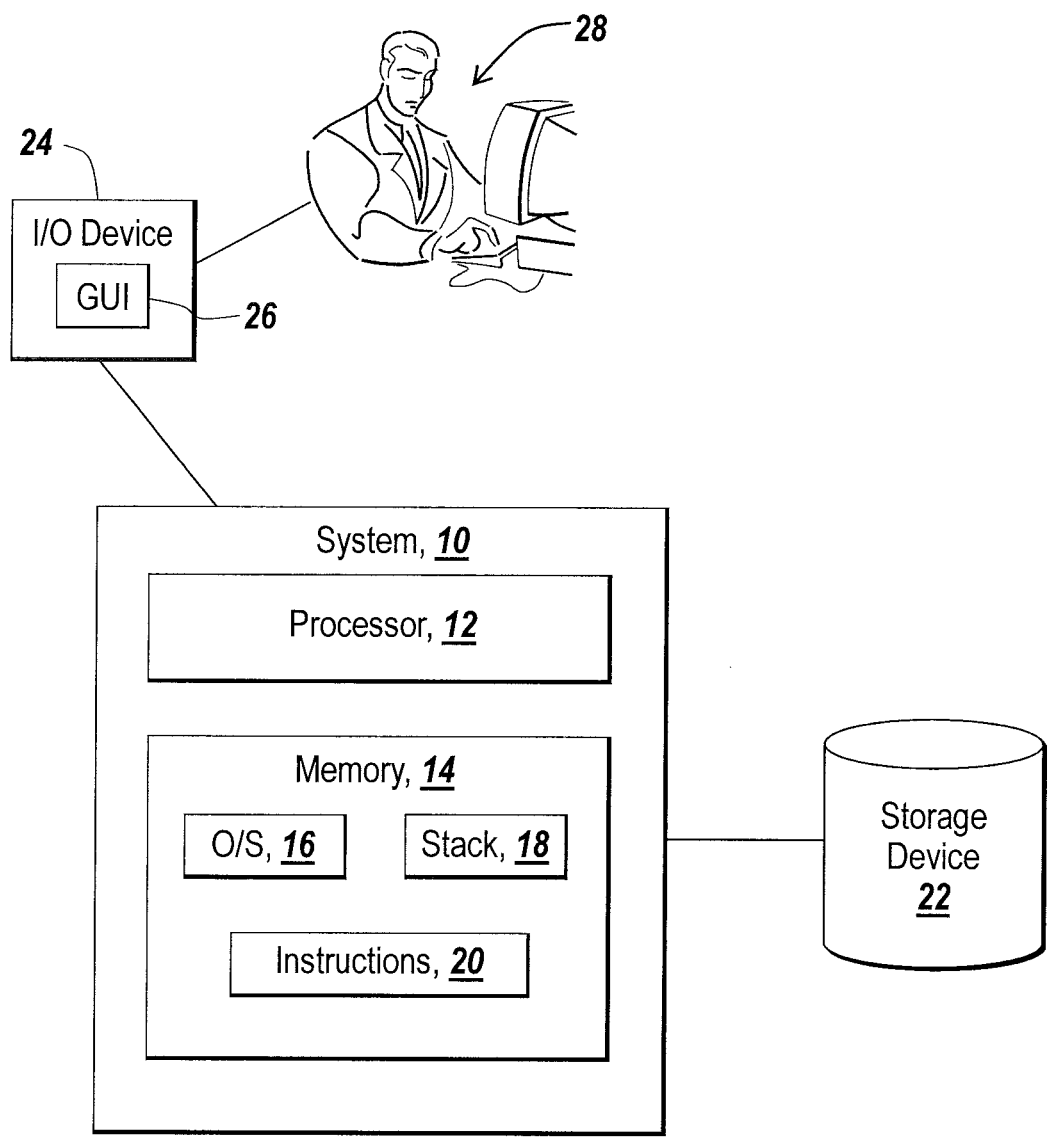
FIG. 1 is a block diagram of a system.

In FIG. 1, a system 10 includes a processor 12 and a memory 14. Memory 14 stores an operating system ("O/S") 16 such as Linux or Microsoft Windows XP, a TCP/IP protocol stack 18 for communicating over a network (not shown), and machine-executable instructions 20 executed by processor 12 to perform a block diagram modeling process 100 below. System 10 also includes a storage device 22 and an input/output ("I/O") device 24. The I/O device 24 can include a graphical user interface ("GUI") 26 for display of a block diagram model to a user 26.

An example block-diagram modeling process 100 is Simulink from The Mathworks, Inc. of Natick, Mass. Other examples of block diagram modeling processes include state-based and flow diagrams such as those found within Stateflow from The Mathworks, Inc. of Natick, Mass., data-flow diagrams, etc.

To illustrate the concepts of this invention, we will focus on time-based block diagrams such as those found in Simulink. Those skilled in the art will recognize that these concepts apply to other block diagram models of computation. Time-based block-diagram modeling simplifies the process of conceptualizing, designing, simulating, and implementing (in software or hardware) dynamic systems. These block-diagrams models define time-based relationships between signals (represented as lines on the block diagram) and state variables representative of a dynamic system. The solution (computation of system response) of the model is obtained by evaluating these relationships over time, where time starts at a user-specified "start time" and ends at a user-specified "stop time". Each evaluation of these relationships is referred to as a time step. Signals represent quantities that change over time, and these quantities are defined for all points in time between the block-diagram's start and stop time. The relationships between signals and state variables are defined by sets of equations represented by blocks. These equations define a relationship between the input signals, output signals, and state variables. Inherent in the definition is the notion of parameters, which are the coefficients of the equations.

Using time-based block-diagram software, such as Simulink, for modeling, simulating, and analyzing a dynamic system typically involves two major phases: edit and execute. In the edit phase, users add or remove blocks to/from the block-diagram model and connect blocks using lines. In particular, users add two categories of blocks: virtual and non-virtual blocks. Virtual blocks do not influence the mathematical model of the dynamic system and are for improving modularity and readability of the block-diagram. Non-virtual blocks directly influence the mathematical equations for the dynamic system. In the execution phase, the model is used to compute and trace the corresponding dynamic system's outputs. During one of the preliminary steps of the execution phase known as the compile stage, virtual blocks are eliminated from the block-diagram and a connectivity graph including only non-virtual blocks is generated.

Examples of virtual blocks are as follows. (a) Virtual subsystems: Modularity is sometimes achieved in a block-diagram by layering the block-diagram through the use of subsystems. A subsystem facilitates layering by allowing a collection of blocks to be represented by a single block with input and output signals. The input and output signals of the subsystem are accessible to the constituent blocks within the Subsystem. A subsystem is virtual if its constituent blocks are moved back into the main block-diagram model during the model's execution. (b) Inports and Outports: Within a virtual subsystem, there needs to be a graphical entity that serves to indicate the signal connections to the parent block-diagram. These entities are special inport and outport blocks that indicate a tunnel-through signal connection to the parent block-diagram. (c) Bus Creators and Selectors: In large models, there may be an extensive set of lines that connect one section of a block-diagram to another section. To avoid excessive clutter of lines and improve readability, there is typically a special block called a Bus Creator that helps bundle all of the lines together to form a single bus line. This single bus line then connects the two sections of the model. At the destination end of the line, a block called a Bus Selector helps un-bundle the individual lines so that they can be connected to other blocks. (d) Froms and Gotos: These are special blocks that help avoid graphical clutter caused by a line that connects two distant sections of a block-diagram. The line is terminated close to its originating point by a From block. At the other end, a new line is drawn from a Goto block that is hot-linked to the From block.

The virtual blocks are one form of navigable blocks where a signal can be traced from input to output and vice versa. Non-virtual blocks could be either navigable or non-navigable. Non-navigable non-virtual blocks do not permit a signal to be traced form input to output, or vice versa. An example of a navigable non-virtual block is the unit delay for which the signal can be traced directly from input to output port. Lines in the block diagram can be labeled to indicate a symbolic name for the signal represented by the line. To aid in tracability of a signal, it is important to be able to be able to propagate and display a unique label on a signal line while it is being traced through various navigable blocks.

In the current state of the art, the tracing and navigation of signals through navigable blocks must be done manually and label propagation is done during block diagram compilation. Once the connectivity graph is made available during block-diagram compilation, it becomes possible to navigate the block-diagram to trace and highlight signals and to propagate labels through all navigable blocks. But, during the edit phase, when the connectivity graph is unavailable, in prior art there are no mechanisms to allow users to navigate through navigable blocks. Furthermore, in prior art, there was no mechanism for marking non-virtual blocks as being navigable.

Figure 2:
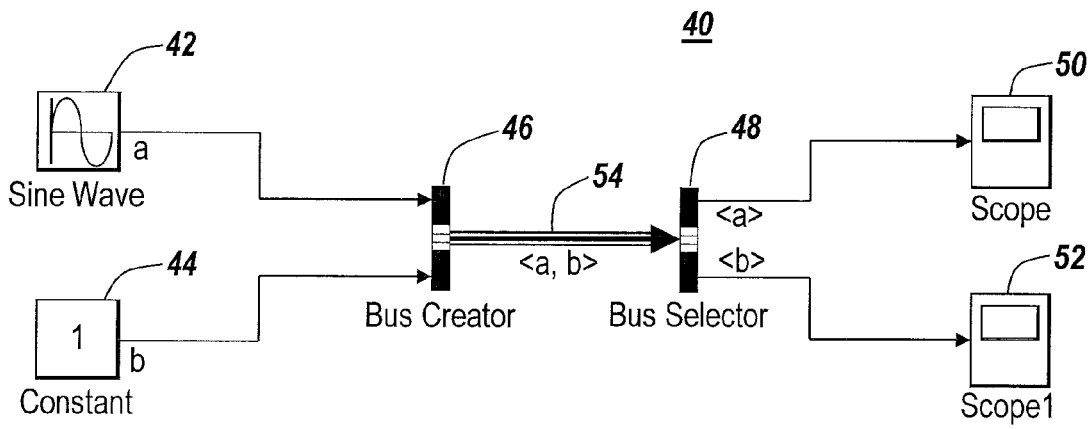
FIG. 2 is a first block diagram model.

In FIG. 2, an exemplary block diagram model 40 includes a sine wave block 42, a constant block 44, a bus creator block 46, a bus selector block 48, a scope block 50 and a scope block 52. The model 40 also includes a signal 54. The signal 54 is a bus that represents a bundle of signals analogous to a bundle of wires held together by tie wraps. Bus creator block 46 and bus selector block 48 are virtual blocks. Sine wave block 42, constant block 44, scope block 50 and scope block 52 are non-virtual blocks. The signal line between the bus creator block 46 and bus selector block 48 is the signal bus 54.

Figure 3:
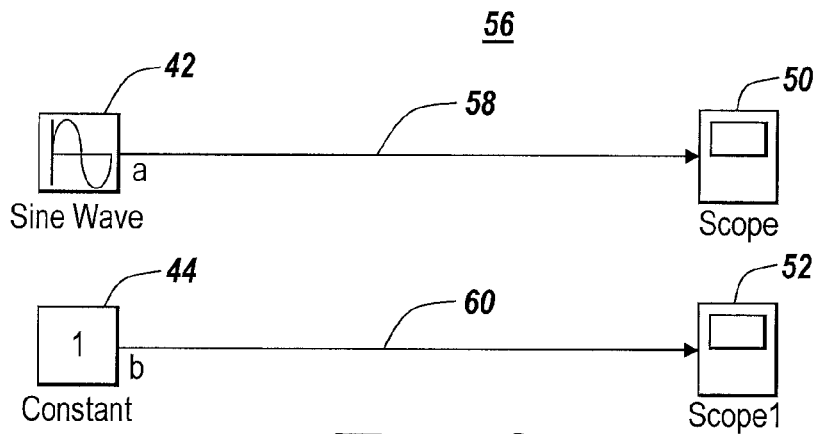
FIG. 3 is a connectivity graph of the block diagram model of FIG. 2.

In FIG. 3, a corresponding connectivity graph 56 of FIG. 2, where the bus selector block 48 and bus creator block 46 are removed, is shown. As discussed above, when the connectivity graph 56 is formed from the model 40 in the block-diagram compile phase, all the virtual blocks are removed. Thus, the connectivity graph 56 does not include the virtual blocks 46, 48, 54. The connectivity graph 56 includes a signal line 58 connecting the sine wave block 42 to the scope block 50 and a signal line 60 connecting the constant block 44 to the scope block 52.

Each signal in a block-diagram can have a name. A label on the corresponding line displays the signal's name. A signal retains its name (or label) when a signal connection can be traced through a navigable block. That is, the label is propagated through all navigable blocks. For example, a name of an output signal of the sine wave block 42 is "a," an input signal of the scope block 50 is connected to signal "a" via the bus creator 46 and the bus selector block 48. These two lines represent the same signal. The signal label "<a>" shown on the input line to the scope block 50 is a propagated signal label. In Simulink®, propagated signal labels are enclosed by angle brackets (" ").

A non-navigable block's output port that generates a signal is referred to as a non-navigable source of the signal. A signal bus can have multiple non-navigable sources. A non-navigable block's input port that reads a signal is referred to as a non-navigable destination of the signal. One signal can have multiple non-navigable destinations. For example, sine wave block 42 is a non-navigable source of the signal "a", and the scope block 50 is a non-navigable destination of the signal "a".

Tasks of signal navigation in a block-diagram include: (1) tracing and highlighting a non-navigable source and non-navigable destination(s) of a signal line; (2) propagating signal labels from a signal's non-navigable source through navigable blocks; (3) displaying connections that are implied by navigable blocks that are implicitly connected to each other; and (4) providing an interface for blocks to specify their navigability properties.

When users are generating block-diagrams to simulate a real-world system, an ability to navigate signals through navigable blocks is needed. This need to navigate is particularly true for large and complex block-diagrams, where a large number of signals can cross multiple layers of the block diagram. In such examples, navigable blocks, such as bus creator block 46 and bus selector block 48 are frequently used for better organizing graphical connections of signals.

In the past, block-diagram software relied on the connectivity graph of a block-diagram for signal navigation, such as signal label propagation. There are a number of limitations of this type of signal navigation process. For example, because the connectivity graph is only generated in the block-diagram compile phase, users are not able to view propagated signal labels, trace non-navigable source and destination(s) of a signal, and highlight a signal connection in the block-diagram, until the block-diagram is compiled and the corresponding connectivity graph is obtained. This limitation prevents users from getting enough graphical feedback, such as viewing propagated signal labels, while editing a block-diagram. Such graphical feedback at the block-diagram edit time is often crucial for detecting a modeling error at an early stage. The computational resources, e.g., time and memory, associated with compilation for a large block-diagram that may contain 1000+ blocks are typically expensive. Users have to wait until the block-diagram compilation is finished to be able to view propagated signal labels and locate non-navigable source and destination(s) of a signal. Thus, in traditional signal navigation mechanism users have to alternate between the block-diagram edit and compile phases. This process is time-consuming. Also, there is no support for specifying the navigability properties of non-virtual blocks.

For another example, because the connectivity graph does not contain any virtual blocks, a one-to-one mapping between the nodes in the connectivity graph and the nodes in the graphical block-diagram generated by a user typically do not exist. The traditional signal navigation process relying on compiled graph connectivity information prevents the user from highlighting a complete signal connection from the signal's non-navigable source through all intermediate navigable blocks to its non-navigable destinations, because in the compile phase, virtual blocks have been removed from the connectivity graph.

Figure 4:
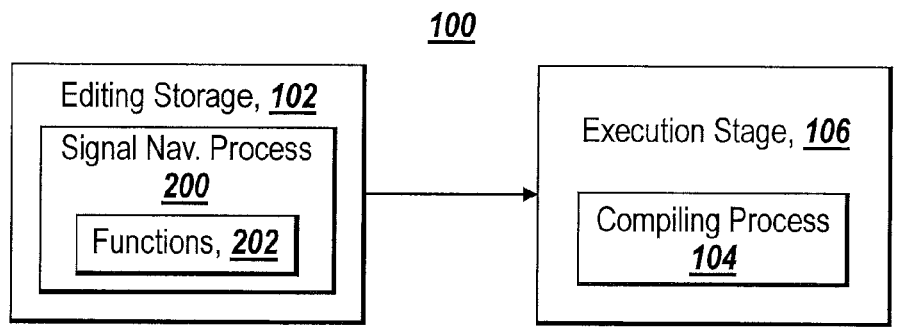
FIG. 4 is a flow diagram of a block diagram modeling process.

In FIG. 4, the block diagram modeling process 100 includes an editing stage (102) and an execution stage (106). In contrast to traditional signal navigation, the block diagram modeling process 100 includes an edit-time signal navigation process 200 that enables users to navigate signals in a block-diagram through navigable blocks in the editing process (102). When a user is editing a block-diagram, a changed signal label is propagated instantly through navigable blocks without having to execute a compilation process (104). The user is also provided an ability to trace a non-navigable source or destination(s) of any signal in the block-diagram at edit time (102). In addition, the user can highlight a signal connection through navigable blocks. With these edit-time signal navigation abilities, users are given instantaneous graphical feedback on the block-diagrams being edited. The edit-time signal navigation process 200 can shorten the time for developing a block diagram model.

The edit-time signal navigation process 200 provides a signal navigation ability at block-diagram edit stage (102). The edit-time signal navigation process 200 does not rely on any information obtained in the block-diagram compile phase (104). The edit-time signal navigation process 200 includes a set of signal navigation functions (202).

A first signal navigation function provided by the edit-time signal navigation process 200 is instantaneous signal label propagation through navigable blocks. When users change a signal's label in the block-diagram via the GUI 26, a user interface such as mouse or keyboard, or programmatically, the changed signal label is instantly propagated to all the signal lines connected through navigable blocks.

A second signal navigation function provided by the edit-time signal navigation process 200 is tracing a signal's non-navigable source and destination(s) from a line. At block-diagram edit time (102), users can request tracing of a signal's non-navigable source or destination(s) from the line that represents the signal. For example, users can right click on a signal line and choose "highlight to source" or "highlight to destination" to trace a signal to its non-navigable source or destination. Alternatively, they may use a user interface such as a keyboard or a programmatic application program interface (API) to request the tracing capability. The second function also highlights the signal connection through navigable blocks. Users can also invoke this function through commands on other user interfaces such as a keyboard or mouse. Additionally, users could invoke this function through the use of a programmatic interface.

A third function provided by the edit-time signal navigation process 200 is tracing signal connections that are implied through implicit block connections. For example, there is an implicit connection between a Goto block and all corresponding From blocks. These implicit connections can be shown on the GUI 26 through an explicitly drawn signal line.

A fourth function provided by the edit-time signal navigation process 200 is providing an interface for each type of block to be able to specify its specific navigability properties. For example, users can utilize this interface to specify the exact navigability property of a custom block that they have defined.

An example of a block navigability interface provided by edit-time signal navigation process 200 is what we refer to as "walkthrough functions for navigable blocks." When a signal is connected to a navigable block's input port, the navigable block knows which output port the signal is effectively connected to. Therefore, the edit-time signal navigation process 200 introduces walk-through for every navigable block, i.e. a walk-through method of a navigable block determines the signal connection across the navigable block. In particular, every navigable block has two walk-through methods, one to its source direction, and the other to its destination direction.

The edit-time signal navigation process 200 includes Graphical User Interfaces (GUIs) for displaying non-navigable source/destination(s) and a signal connection. When users work on complex block-diagrams, it is often difficult to track a signal connection visually. Therefore, it is necessary to make the signal connection and the identified non-navigable source or destination(s) stand out from the rest of the block-diagram.

The edit-time signal navigation process 200 implements a GUI representation for visually displaying results from signal navigation. The GUI representation for visually displaying results from signal navigation can include one or more of the following four elements.

A first element of the GUI representation defines a highlighting contrast value for determining the contrast between the highlighted portion and the remainder of a block-diagram. The first element can also include a command (or a GUI) for users to change this contrast value to their preferable number.

A second element of the GUI representation highlights the non-navigable source or destination blocks.

A third element of the GUI representation highlights the entire signal connection from its non-navigable source to non-navigable destination(s).

A fourth element of the GUI representation fades the remainder of the block-diagram so that the highlighted portion is easy to identify.

In an example, highlighting and fading are combined in the GUI representation such that not only is the users' attention attracted to the highlighted portion, but the GUI representation also de-emphasizes the remainder of the block-diagram and removes distractions for the user. The highlighting and fading can be extended to other examples that use GUI representation for highlighting objects.

The edit-time signal navigation process 200 includes inputs and outputs for edit-time label propagation. Inputs include a block diagram containing blocks interconnected by lines, a signal line whose label is being edited in the block diagram model, and a signal's new label and old label. Outputs include signal labels of all the lines that can be propagated to/from the signal line whose name is being edited and display the propagated signal labels to these lines.

The edit-time signal navigation process 200 includes inputs and outputs for edit-time signal non-navigable source and destination(s) tracing from a line. Inputs include a block diagram containing blocks interconnected by lines and a signal line being selected for tracing its source or destination(s). Outputs include highlighted non-navigable source or destination(s) block and highlighted signal connection from the selected line to its source or destination direction or both.

The edit-time signal navigation process 200 includes inputs and outputs for tracing implied connections between implicitly connected blocks. Inputs include a block-diagram containing blocks, including implicitly connected blocks, interconnected by lines and a selected block with an implicit connection. Output includes either a textual or a highlighted display of the implicit connection and the block(s) connected to the selected block.

In general, a data structure can be used to represent a signal line(s) as:
1 class SignalLine {private: String label; OutputPort source; int numDestinations; InputPort*destinations; public: <Methods for Signal class>};

We now describe processes for tracing the non-navigable source and destination(s) of a signal line. We first present an overview of walk-through functions and their implementations for some common navigable blocks. Finally, we use flow-diagrams to describe how walk-through functions may be used to trace the non-navigable source and destination(s) of a signal line.

Each block data-structure can be considered to implement a pair of walk-through functions that operate on the block. There are two kinds of walk-through functions, i.e., walk-through to source direction and walk-through to destination direction, for every block. Both walk-through functions receive two incoming arguments and two outgoing arguments. For walking through to source direction, we pass the block's output port index (outputPortIndex) and the selected line's graphical destination input port (origInputPort) into the block's WalkThroughToSourceDirection function, and this function returns the number of input ports (*num) it can walk through to and an array of such input ports (*inputPorts). For walking through to destination direction, we pass the block's input port index (inputPortIndex) and the selected line's graphical source port (origOutputPort) into the block's WalkThroughToDestinationDirection function, and this function returns the number of output ports (*num) it can walk through and an array of such output ports (*outputPorts). A possible implementation is as follows:
2 class Block {private: <Block data fields> <Block private methods> public: <Other block methods> WalkThroughToSourceDirection (int outputPortIndex, InputPort origInputPort, int*num, InputPort*inputPorts); WalkThroughToDestinationDirection (int inputPortIndex, OutputPort origOutputPort, int*num, OutputPort*outputPorts);};

For example, we describe the walk-through functions for a non-virtual block, "From", "Goto", "Bus Creator" and "Bus Selector" blocks as follows:

For a non-navigable non-virtual block, both walk-through functions return number of ports (num) they can walk to as 0. They also return empty for the port indices (inputPortIndices or outputPortIndices). However, the system can also explicitly specify walk-through functions for non-virtual blocks as desired. The Goto block's WalkThroughToDestinationDirection function returns num to be equal to the number of From blocks driven by the Goto block. The function also returns the output ports of all of the From blocks (in outputPorts).

The From block's WalkThroughToSourceDirection function returns num to be equal to 1 because there is exactly one Goto block driving the From block. The function also returns the input port of the Goto blocks (in inputPorts).

The Bus Selector block's WalkThroughToDestinationDirection function first checks the structure of the signal connected to origOutputPort to see if it is a bus. If the signal is not a bus, then the block checks each of its output ports to determine which output port signal corresponds to the signal connected to origOutputPort. This port is returned in outputPorts. If the signal connected to origOutputPort is a bus, then the block checks each of its output ports to see if any signal in the bus is part of the output port signal. All ports that correspond to signals in the bus connected to origOutputPort are returned in outputPorts.

The Bus Creator's WalkThroughToSourceDirection function first checks the structure of the signal connected to origInputPort to see if it is a bus. If the signal is not a bus, then the block checks each of its input ports to determine which input port signal corresponds to the signal connected to origInputPort. This port is returned in inputPorts. If the signal connected to origInputPort is a bus, then the block checks each of its input ports to see if any signal in the bus is part of the input port signal. All ports that correspond to signals in the bus connected to origInputPort are returned in inputPorts.

Similar functions can be defined on Inports, Outports, and Virtual Subsystems to help with walk through.

Figure 5:
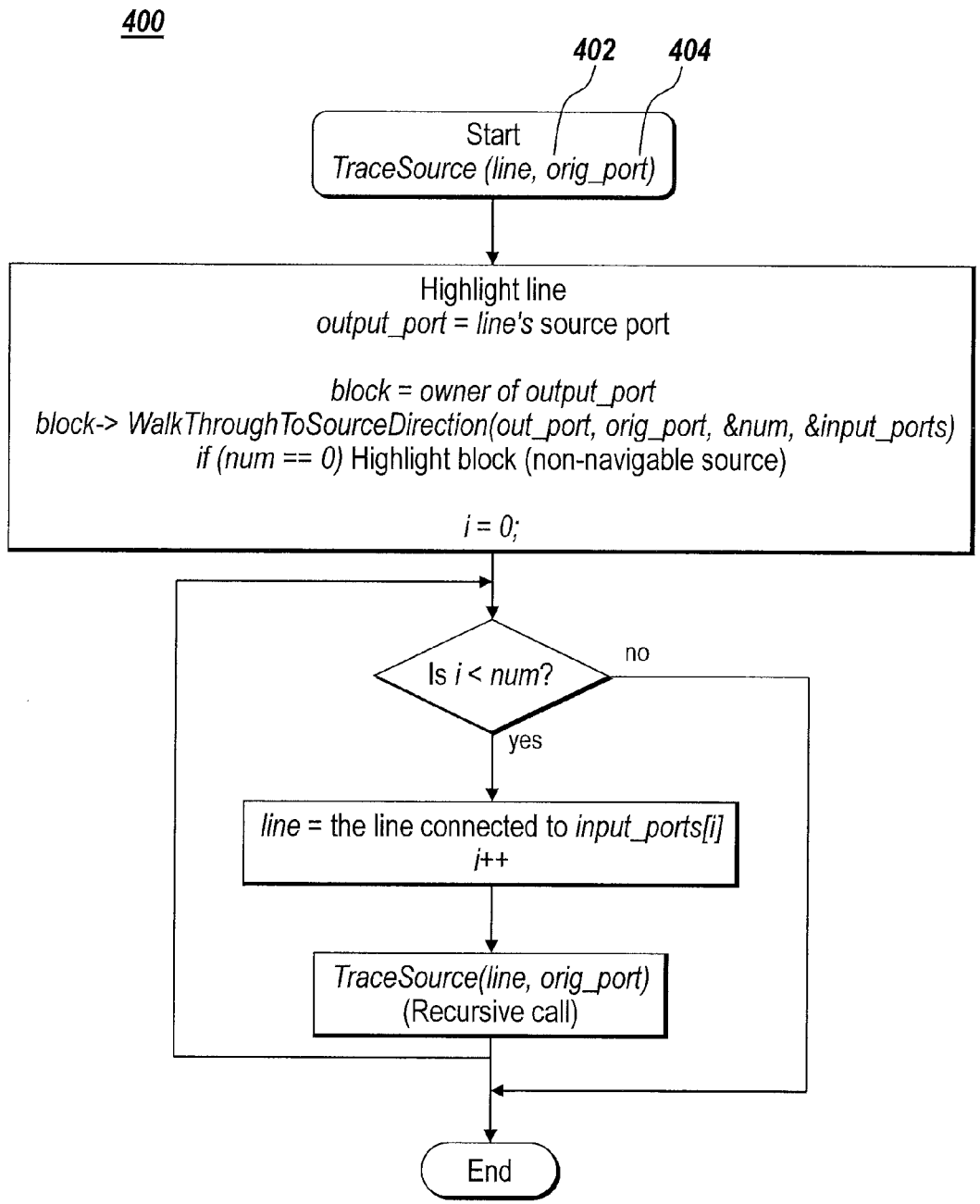
FIG. 5 is a flow diagram of a signal non-navigable destination tracing function.

In FIG. 5, a signal non-navigable source tracing function 400 TraceSource
(Line line, InputPort orig_port) is shown. The function 400 receives two parameters, i.e., line 402 and input port 404 and uses walk through recursively to trace back to the non-navigable source of a signal.

Figure 6:
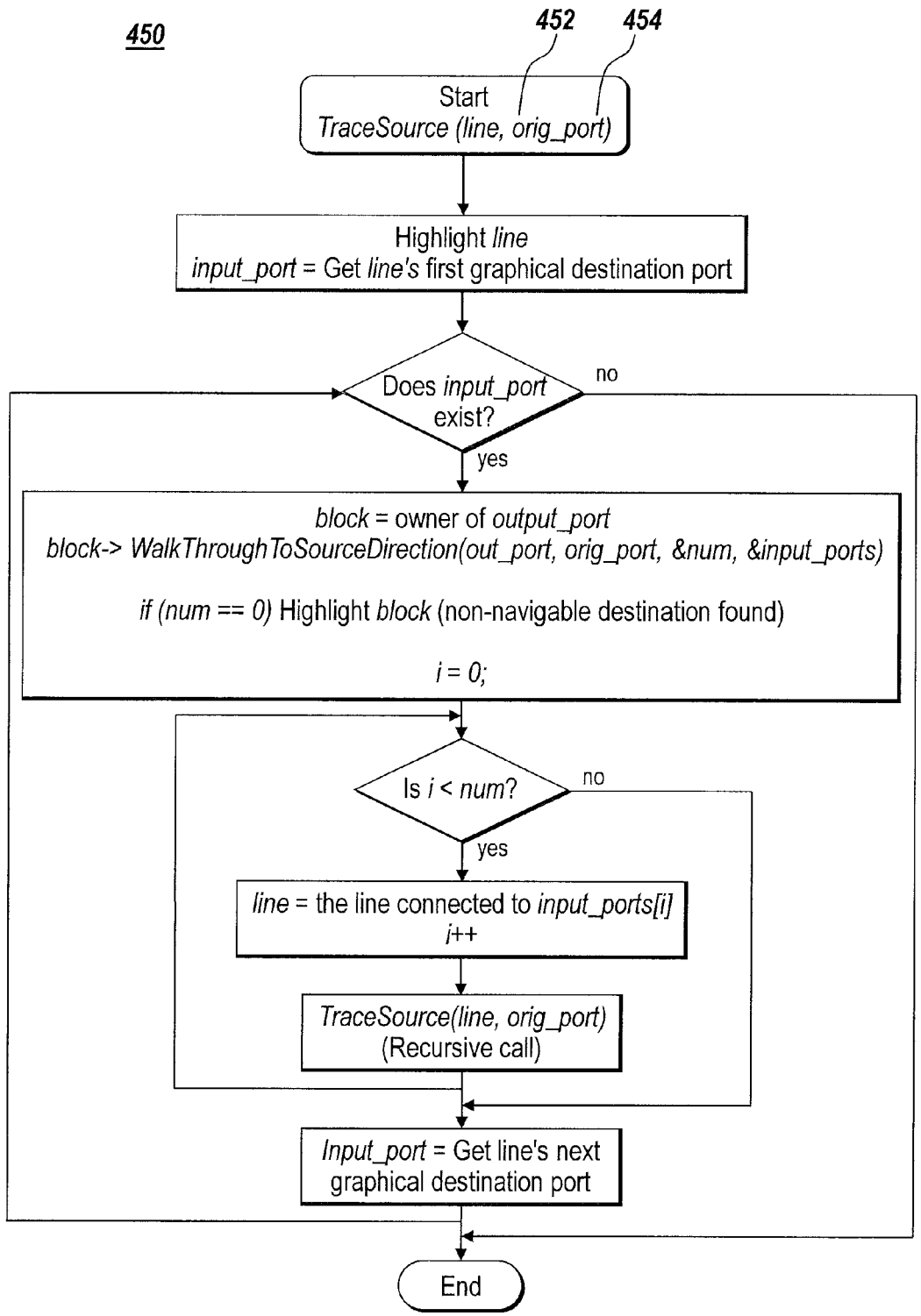
FIG. 6 is a flow diagram of a signal non-navigable destination tracing function.

In FIG. 6, a signal non-navigable destination tracing function 450 TraceDestination (Line line, OutputPort orig_port)

is shown. The function 450 receives two parameters, i.e., line 452 and output port 454 and uses walk through recursively to trace back to non-navigable destination of a signal.

An edit-time signal label propagation process is similar to the non-navigable destination tracing process described above. A SignalLabelProp function (Line line, OutputPort orig_port, String new-label, String old-label) accepts four arguments. First, the line where the signal label changes. Second, the graphical source port of the line. Third, the new signal label. Fourth, the old signal label. This function starts from the line where the signal label changes and visits all the signal lines connected by navigable blocks like the functions TraceSource and TraceDestination. For each visited signal line, update its signal label, i.e. replace old-label with new-label. In Simulink®, a bus selector block determines which input signal is connected to which output signal by matching signal labels. When an input bus selector block is encountered, some additional care is needed. In the selected signals, we replace old-label with new-label, thus the signal connection remains unchanged, although signal label is updated.

Figure 7:
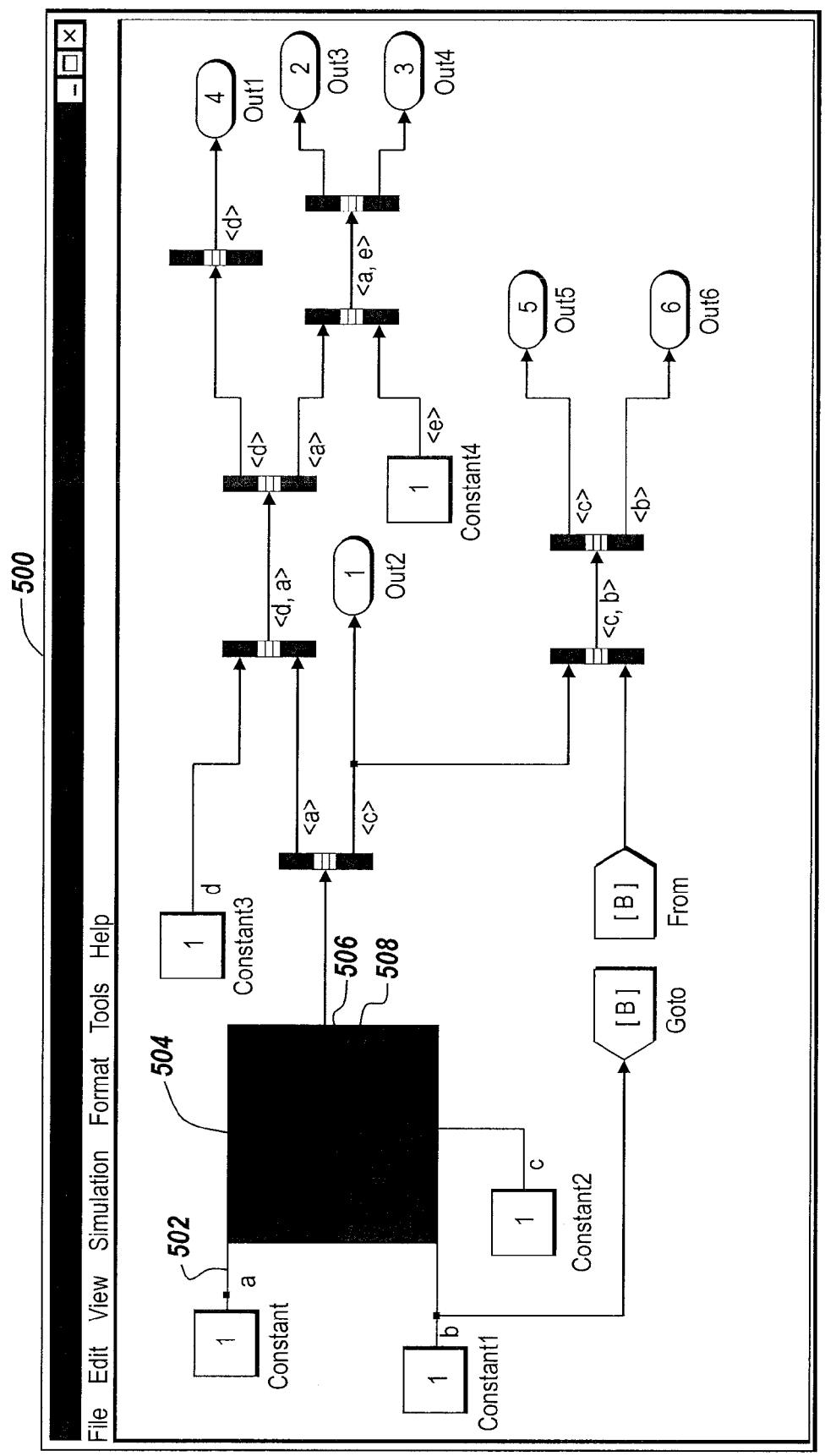
FIG. 7 is a graphical user interface (GUI).

In FIG. 7, a Graphical User Interface (GUI) 500 is shown for non-navigable source and destination(s) tracing. A signal line "a" 502 is selected, the right click context menu 504 has two highlighting items: "Highlight to source" 506 and "Highlight to destination" 508, which are used to trace the non-navigable source and destination(s) of the signal "a", respectively.

Figure 8:
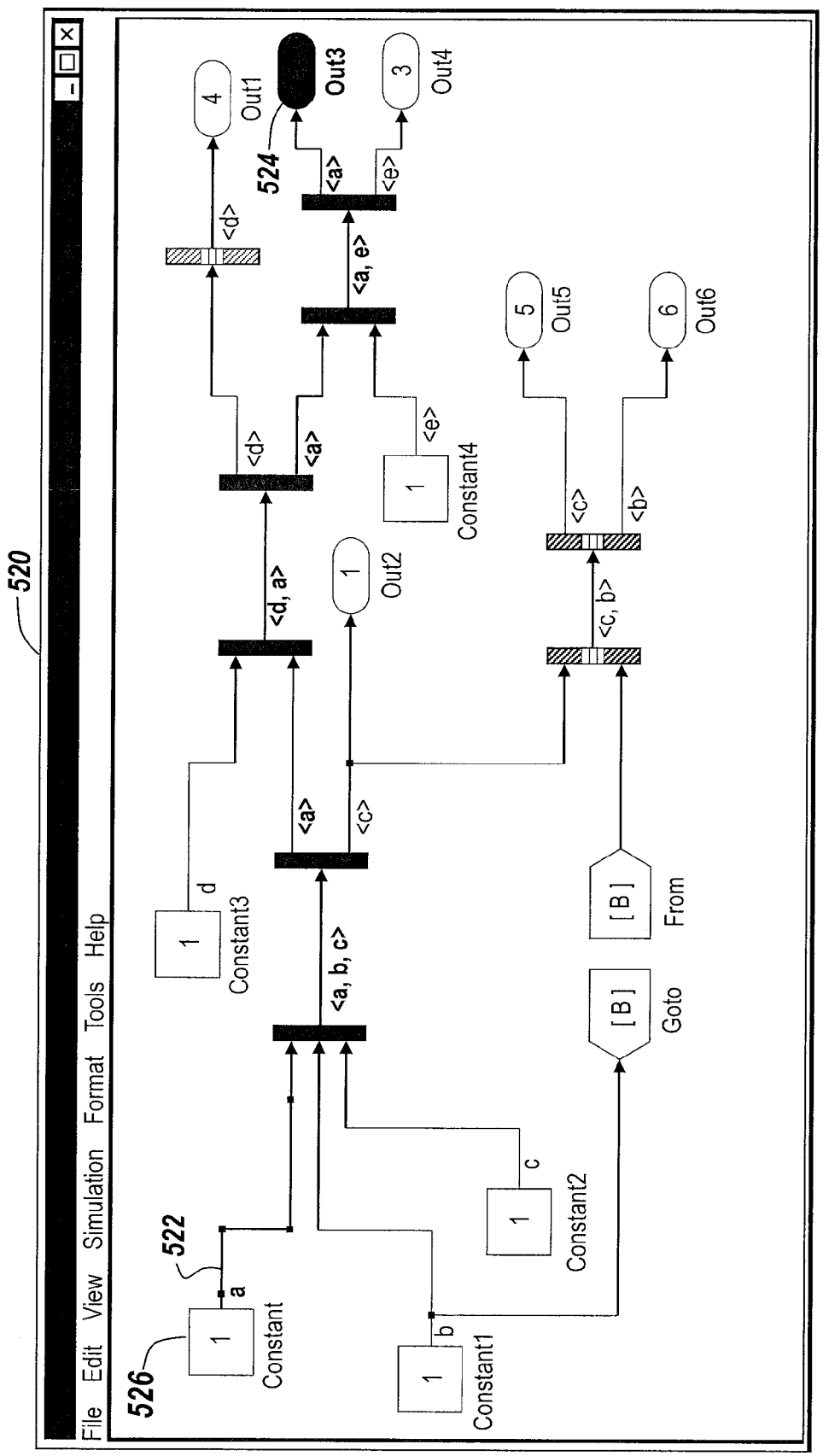
FIG. 8 is a GUI.

In FIG. 8, a GUI 520 is shown. Tracing the non-navigable destination of the signal line "a" 522, which is "Out3" block 524. The GUI 520 shows three things. First, the full signal connection from "Constant1" block 526 (non-navigable source) to "Out3" (non-navigable destination) block 524 is highlighted. Second, the non-navigable destination block is highlighted with shaded background and shaded foreground colors. Third, the remainder of the block-diagram fades so that the highlighted portion stands out.

Figure 9:
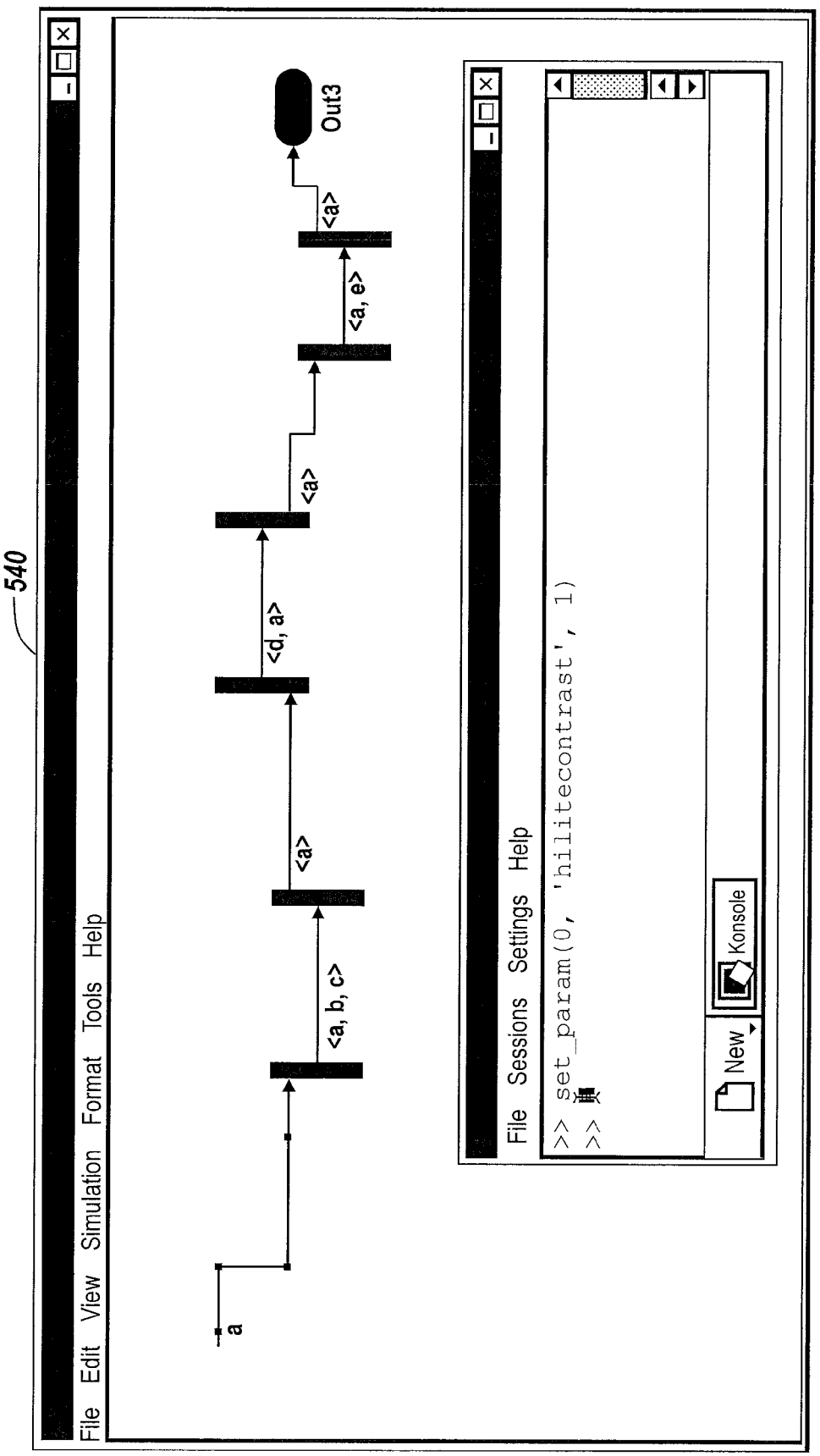
FIG. 9 is a GUI.

In FIG. 9, a GUI 540 is shown. Setting the highlighting contrast to its maximum value, tracing the non-navigable destination of a signal line. The remainder of the model vanishes.

Figure 10:
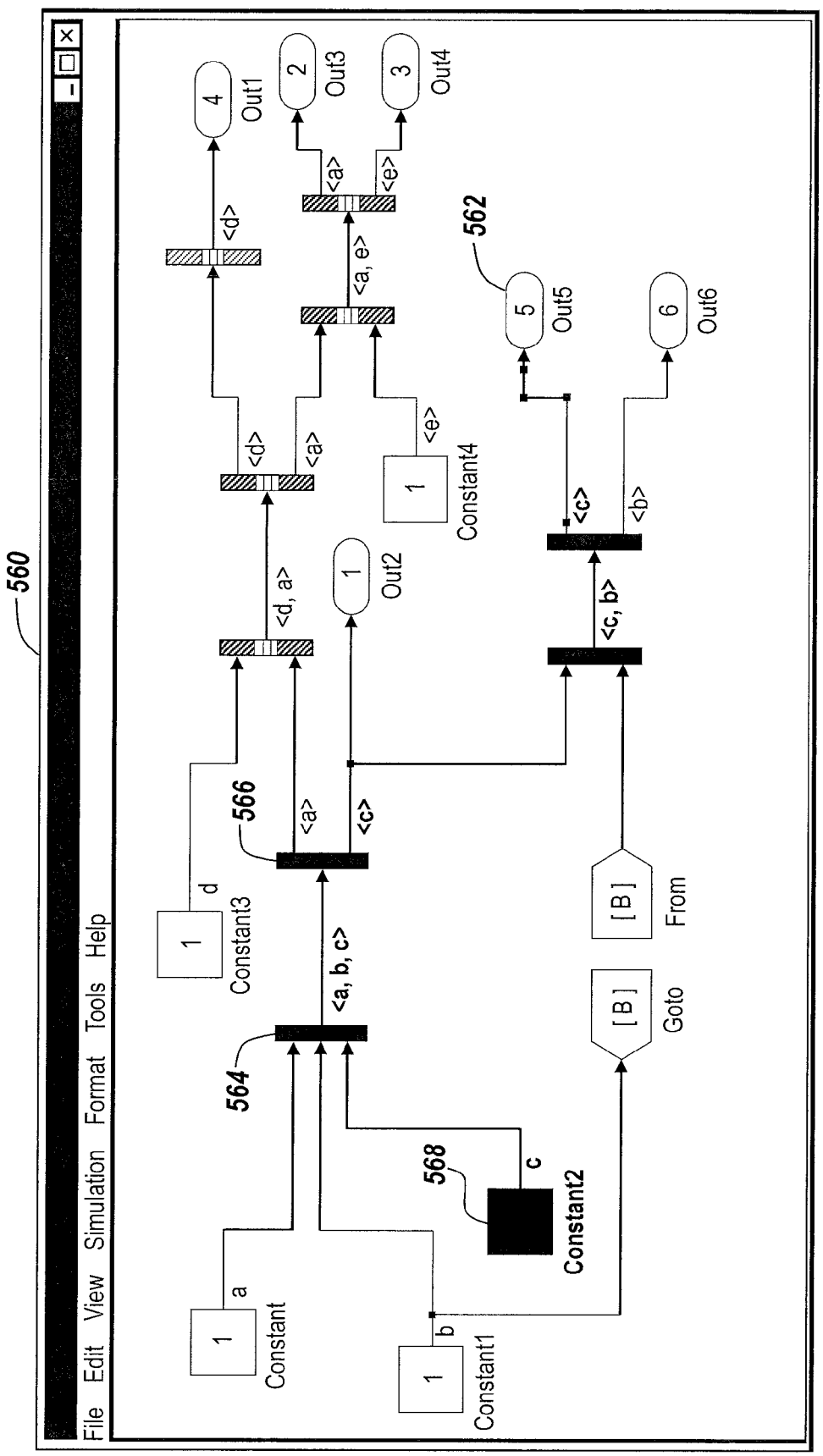
FIG. 10 is a GUI.

In FIG. 10, a GUI 560 is shown. Tracing the non-navigable source of the signal coming into the input port of the "Out5" block 562. The full signal connection through navigable blocks ("Bus Creator" 564 and "Bus Selector" 566 blocks) is highlighted. The non-navigable source block, which is the "Constant2" block 568 is highlighted with shaded background and shaded foreground colors.

Figure 11:
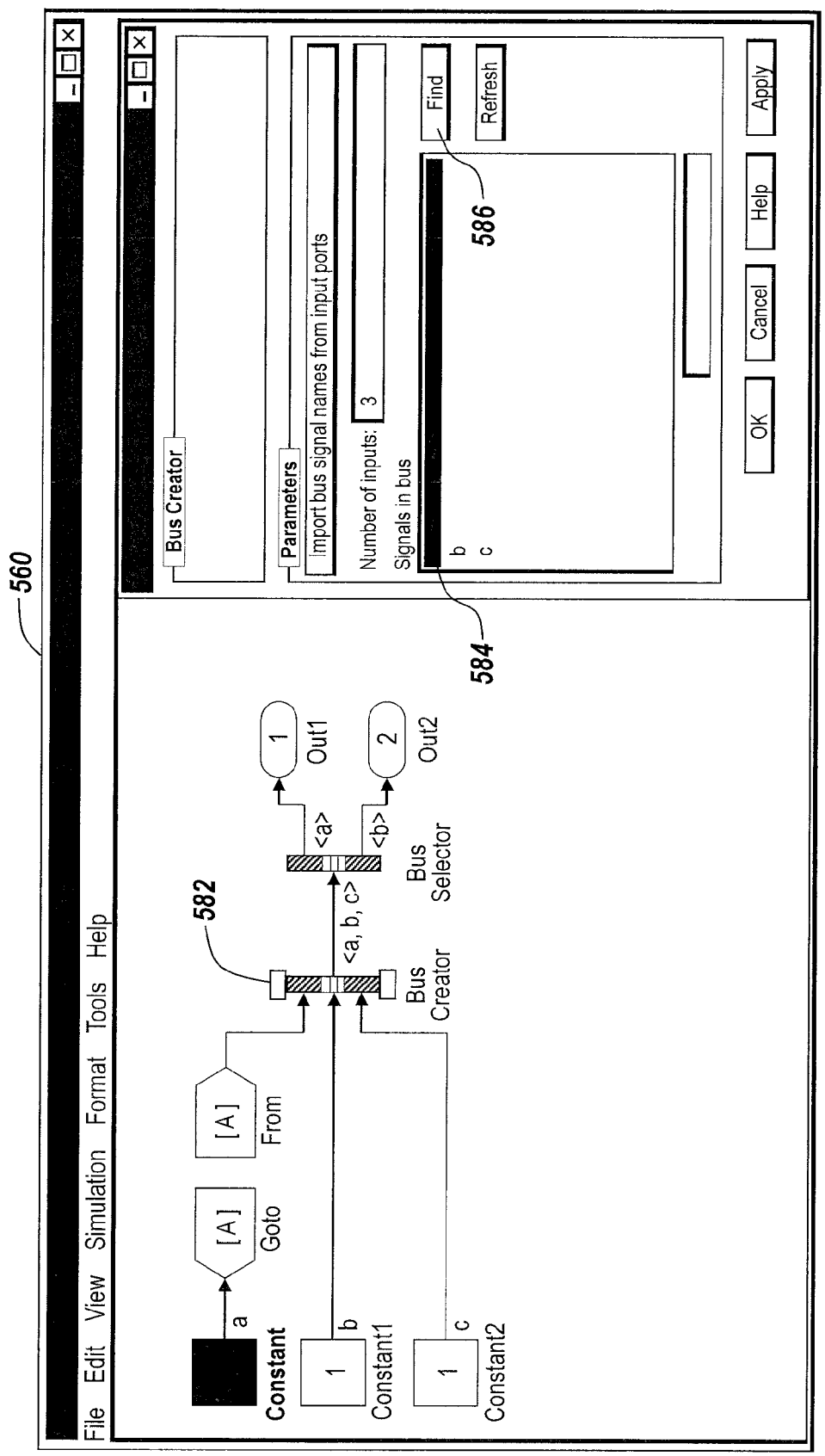
FIG. 11 is a GUI.

In FIG. 11, a GUI 580 is shown. Tracing the non-navigable source of the signal labeled as "a" from the "Bus Creator" block 582. Select "a" from the dialog box 584 of the "Bus Creator" block 582, and press "Find" button 586, the non-navigable source block of the signal "a" is highlighted. Multiple signals can be selected and highlighted, e.g. "a", "b", "c" can be selected simultaneously, then press "Find" button 586, three non-navigable sources are highlighted.

Figure 12:
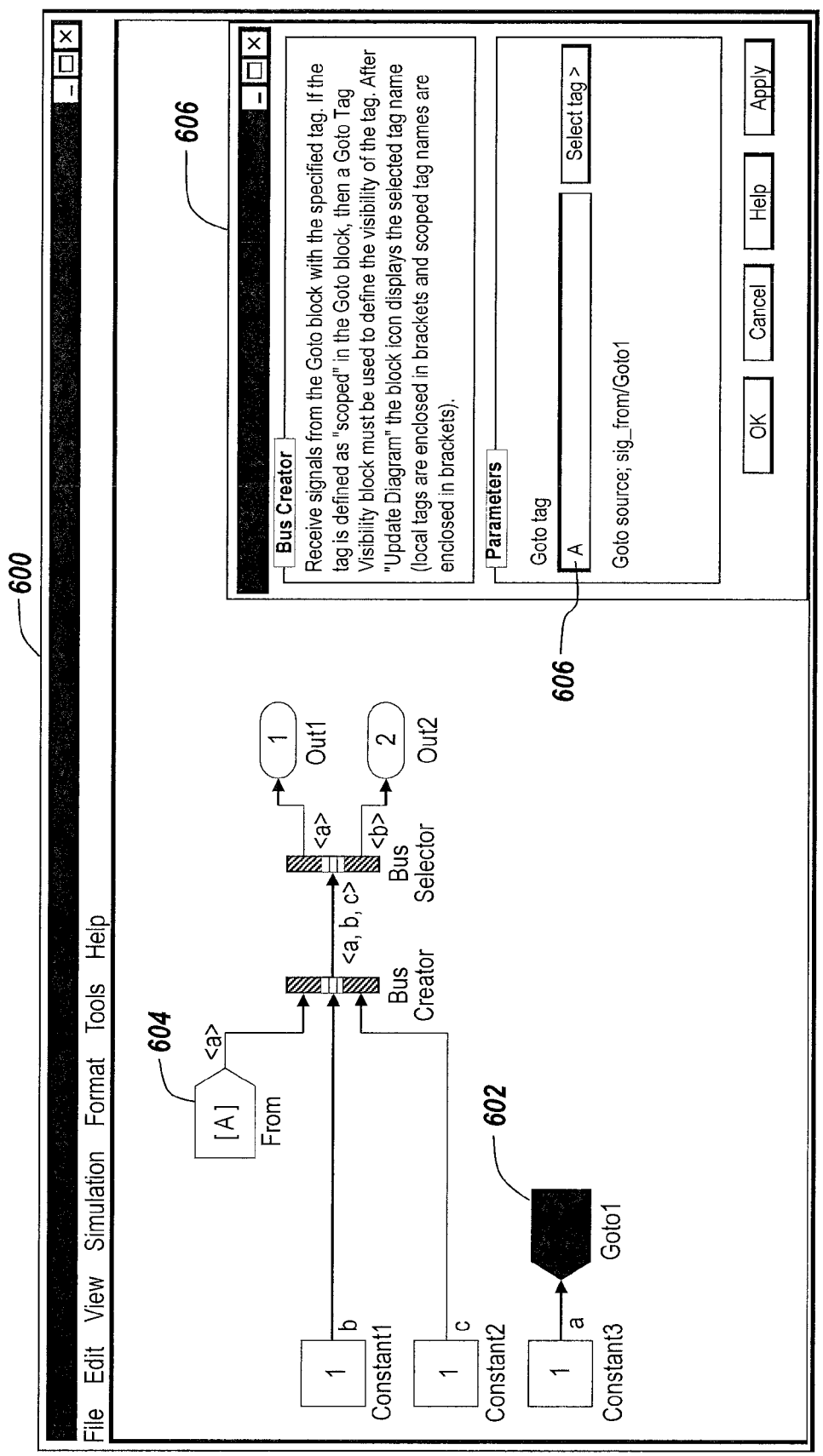
FIG. 12 is a GUI.

In FIG. 12, a GUI 600 is shown. Tracing the corresponding "Goto" block 602 from a "From" block 604. Open the dialog box 606 of the "From" block 604, double click on the line next to the "Goto source" label 606, the corresponding "Goto" block 602, which is "Goto1" in this example, is highlighted. This is an example of tracing implicit signal connections.

Figure 13:
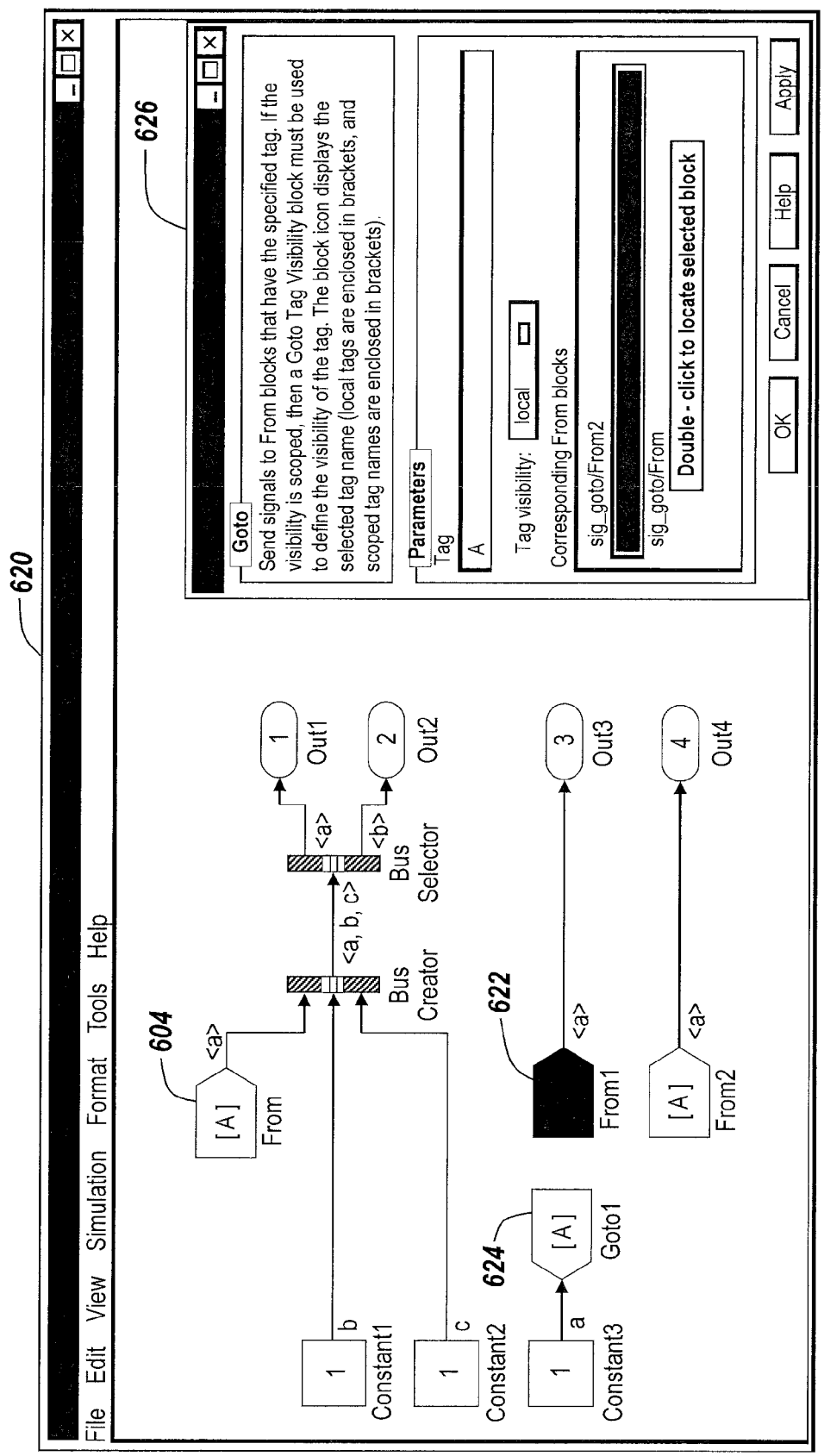
FIG. 13 is a GUI.

In FIG. 13, a GUI 620 is shown. Tracing the corresponding "From" block 622 from a "Goto" block 624. In this example, open the dialog box 626 of the "Goto1" block 624, there are three "From" blocks derived from this "Goto" block. Double clicking on the name of a "From" block will highlight the corresponding "From" block. Multiple "From" blocks can be traced simultaneously by selecting multiple "From" blocks from the dialog box 626. This is an example of tracing implicit signal connections.

Figure 14:
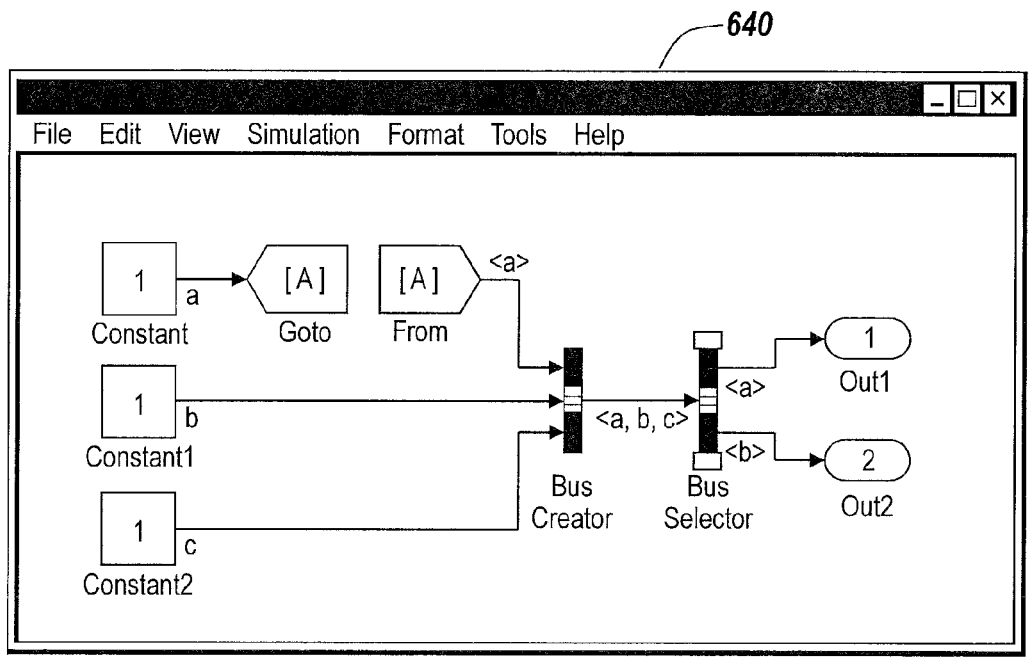
FIG. 14 is a GUI.

In FIG. 14, a GUI 640 shows the original block-diagram for edit-time signal label propagation example, described above.

Figure 15:
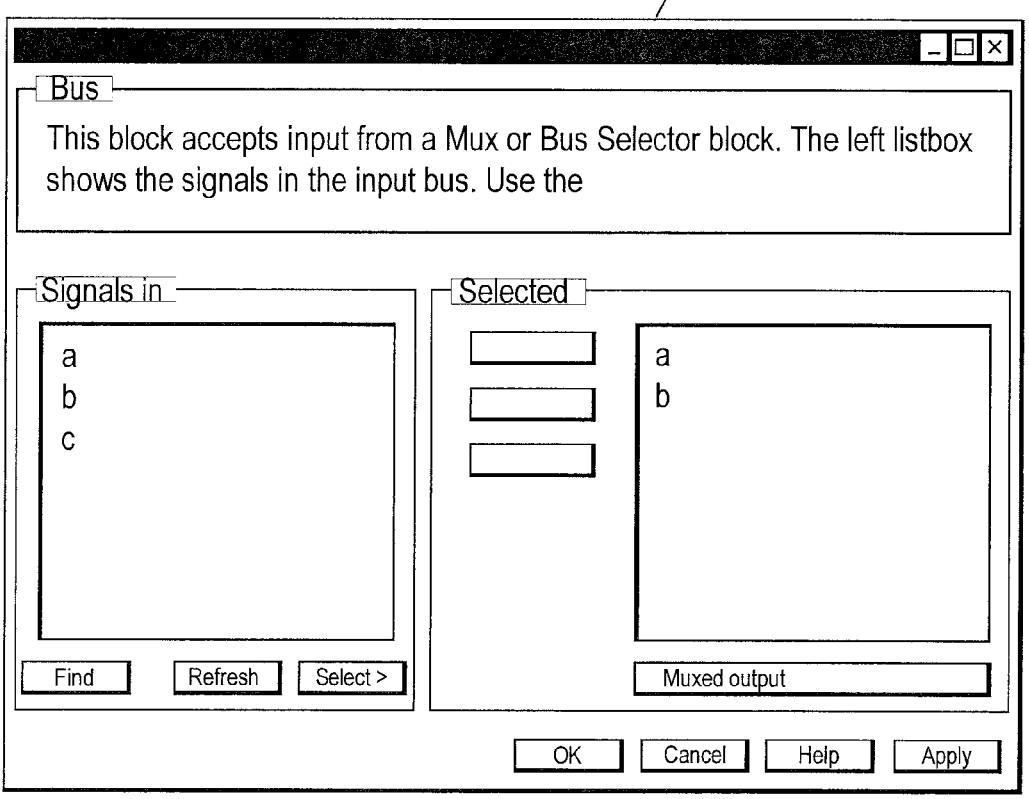
FIG. 15 is a GUI.

In FIG. 15, a GUI 660 includes the dialog box of the "Bus Selector" block in FIG. 14. The input signals include "a", "b" and "c" as shown on the left side. The selected signals include "a" and "b" as shown on the right side.

Figure 16:
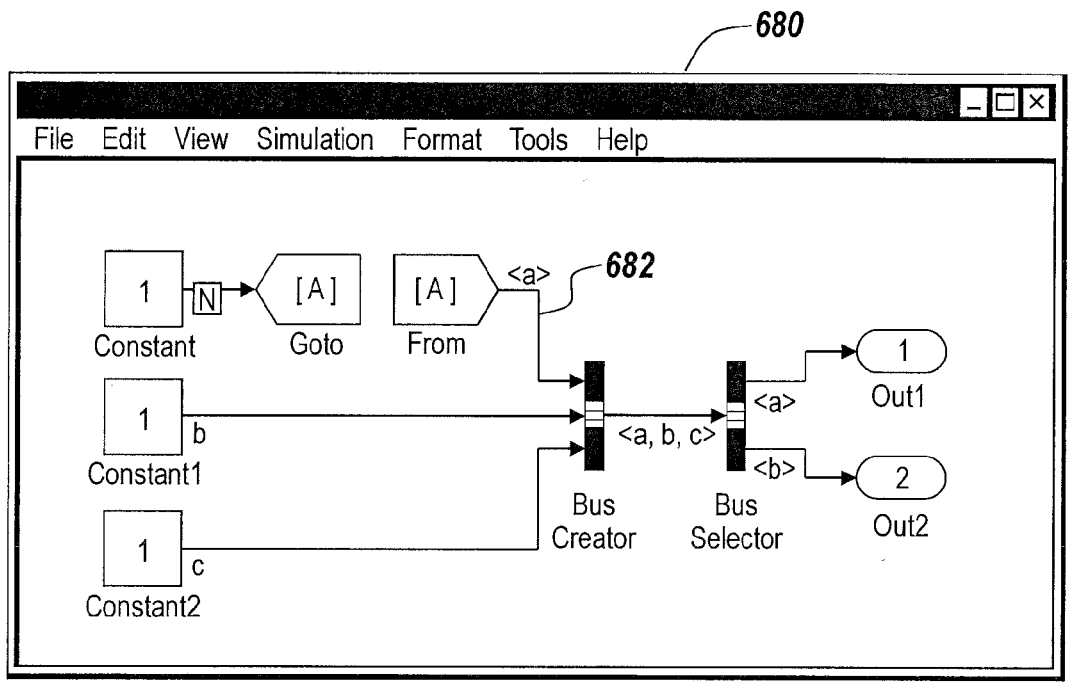
FIG. 16 is a GUI.

In FIG. 16, a GUI 680 includes changing the signal label 682 "a" to "N".

Figure 17:
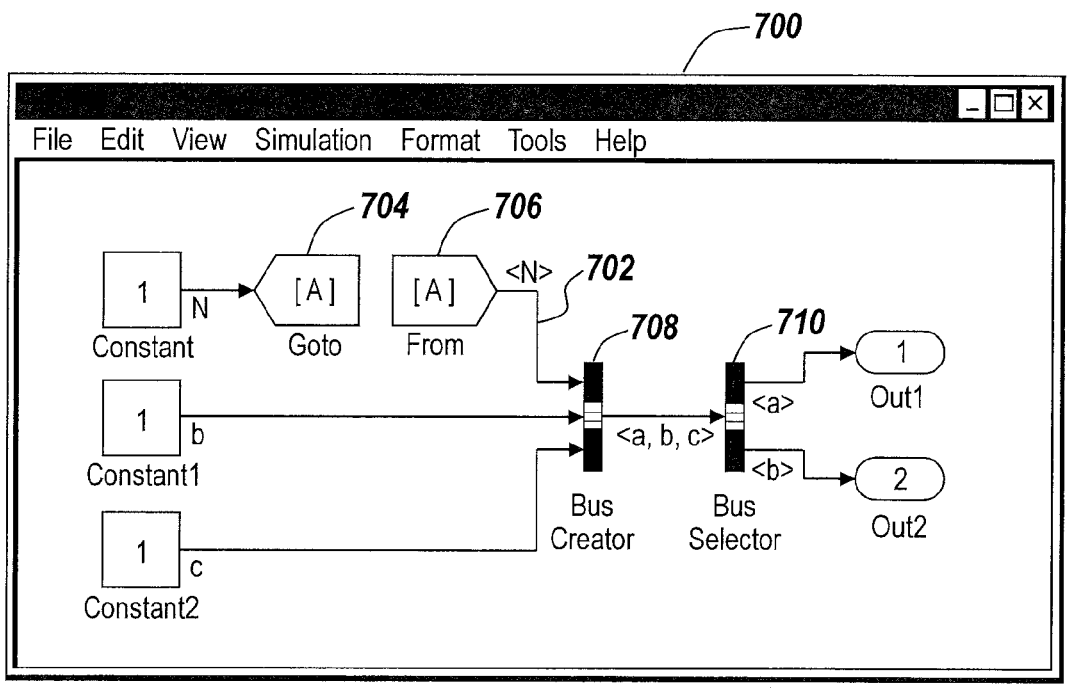
FIG. 17 is a GUI.

In FIG. 17, a GUI 700 shows that as soon as the signal label 702 is changed, the new label "N" is propagated through navigable blocks, i.e. "Goto" 704, "From" 706, "Bus Creator" 708 and "Bus Selector" 710 blocks.

Figure 18:
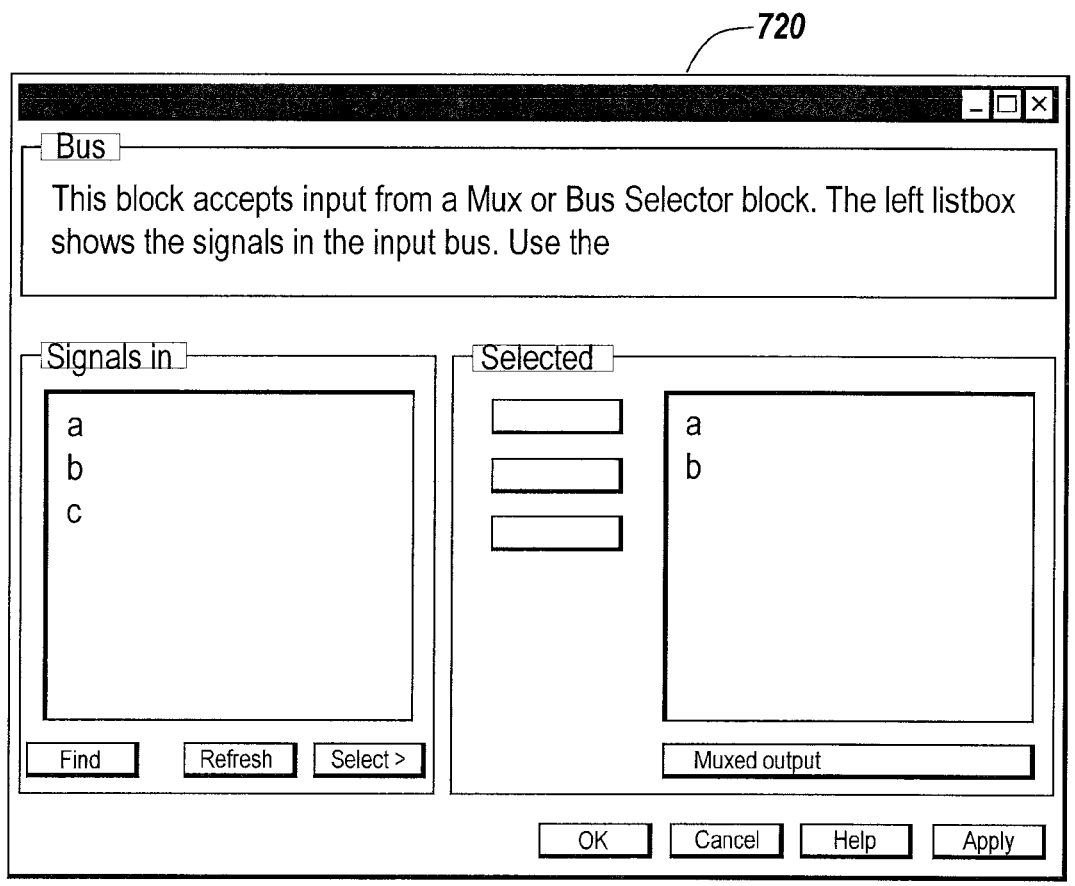
FIG. 18 is a GUI.

In FIG. 18, a GUI 720 shows when the new signal label "N" is propagated to the "Bus Selector" block, the "Bus Selector" block automatically updates "a" to "N" in selected signal column.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results. Accordingly, other embodiments are within the scope of the following claims.

What is claimed is:

1. A non-transitory medium storing machine-executable instructions, that when executed on a processor, cause the processor to:
   display a block diagram via a computer-driven graphical user interface (GUI); and
   edit the block diagram during an edit phase to produce at least one edited diagram on the GUI, where:
      the at least one edited diagram includes a plurality of blocks and one or more lines connecting the plurality of blocks,
      the plurality of blocks having types including navigable blocks and non-navigable blocks,
      the editing comprising:
         navigating signals through the navigable blocks in the at least one edited diagram, the navigating comprising:
            propagating a signal label through the navigable blocks in the at least one edited diagram, →tracing a non-navigable source and destination of a signal in the at least one edited diagram,
            tracing signal connections that are implied through implicit block connections in the at least one edited diagram; and
            specifying navigability properties for each type of block of the plurality of blocks in the at least one edited diagram by way of an interface for the each type of the block.

2. The medium of claim 1 further storing one or more instructions that when executed on the processor, cause the processor to:
   provide graphical feedback on the at least one edited diagram.

3. The medium of claim 1 wherein the non-navigable source and destination of the signal are traced from one of the one or more lines.

4. The medium of claim 1 wherein the non-navigable source and destination of one of the signals are traced from one of the one or more lines in the at least one edited diagram by choosing, respectively, an option to highlight to source or an option to highlight to destination from a dialogue box presented on the GUI.

5. The medium of claim 1 wherein the tracing the non-navigable source and destination of the signal in the at least one edited diagram is invoked using a user interface or an application programmer's interface (API).

6. The medium of claim 1 wherein the implicit block connections include a connection between a Goto block and a From block.

7. The medium of claim 6 wherein the implicit block connections are shown on the GUI by way of an explicitly drawn signal line.

8. The medium of claim 1 wherein the specific navigability properties include an exact navigability property of a custom block defined by a user.

9. The medium of claim 1 wherein the interface for the each type of the block includes walkthrough-functions-for-navigable-blocks.

10. The medium of claim 9 wherein the walkthrough-functions-for-navigable-blocks apply to one of the navigable blocks of the block diagram model, the one of the navigable blocks having a plurality of input ports and a plurality of output ports, one of the signals connected to an input port of the one of the navigable blocks providing an input port signal;
   wherein the walkthrough-functions-for-navigable-blocks permits the one of the navigable blocks to identify which one of the plurality of output ports the input port signal is effectively connected to when the input port signal is connected to one of the plurality of input ports.

11. The medium of claim 1 wherein:
   one of the navigable blocks has a plurality of input ports and a plurality of output ports,
   one of the signals connected to an input port of the one of the navigable blocks provides an input port signal,
   the one of the navigable blocks has two walk-through methods;
      a source direction method operating with a source direction of the input port signal, and
      a destination direction method operating with a destination direction of the input port signal.

12. The medium of claim 11 further storing one or more instructions that when executed on the processor, cause the processor to:
   pass, using source direction method, an output port index of the one of the navigable blocks and a graphical destination input port of a selected line into a first function of the one of the navigable blocks, and the first function returns a number of input ports to which the function can walk and an array of the number of input ports.

13. The medium of claim 12 further storing one or more instructions that when executed on the processor, cause the processor to:
   pass, using the destination direction method, an input port index of the one of the navigable blocks and a graphical source output port of a selected line into a second function of the one of the navigable blocks, and the second function returns a number of output ports to which the function can walk and an array of the number of output ports.

14. The medium of claim 13 wherein:
   for non-navigable and non-virtual blocks, the first function and the second function both return number of ports to which each the function can walk as being equal to zero.

15. The medium of claim 12 wherein:
   the one of the navigable blocks is a Goto block; and
   the second function of the Goto block returns number of output ports to be equal to a number of From blocks driven by the Goto block.

16. The medium of claim 12 wherein:
   the one of the navigable blocks is a From block; and
   the first function of the From block returns number of input ports equal to one.

17. The medium of claim 1 wherein one of the navigable blocks is a Bus Creator block, and the medium further stores instructions that when executed on the processor, cause the processor to:
   check a structure of a signal connected to a first input port of the Bus Creator block to determine whether the signal connected to the first input port is a bus;
   check, when the signal connected to the first input port is not a bus, each input port of the Bus Creator block to determine a particular input port having a signal corresponding to the signal connected to the first input port and returns the particular input port in input ports; and
   check, when the signal connected to the first input port is a bus, each input port to determine whether a signal in the bus is part of the signal connected to the first input port and all ports that correspond to signals in the bus connected to the first input port are returned in input ports.

18. The medium of claim 1 wherein one of the navigable blocks is a Bus Selector block, and the medium further stores instructions that when executed on the processor, cause the processor to:
  check a structure of a signal connected to a first output port of the Bus Selector block to determine if the signal connected to the first output port is a bus;
  check, when the signal connected to the first output port is not a bus, each output port of the Bus Selector block to determine a particular output port having a signal corresponding to the signal connected to the first output port and returns the particular output port in output ports; and
  check, when the signal connected to the first output port is a bus, each output port to determine whether a signal in the bus is part of the signal connected to the first output port and all ports that correspond to signals in the bus connected to the first output port are returned in output ports.

19. A system comprising:
a display for:
  displaying a block diagram via a computer-driven graphical user interface (GUI); and
a processor executing instructions for:
  editing the block diagram during an edit phase to produce at least one edited diagram on the GUI, where:
    the at least one edited diagram includes a plurality of blocks and one or more lines connecting the plurality of blocks,
    the plurality of blocks includes navigable blocks and non-navigable blocks,
    the editing comprising:
      navigating signals through the navigable blocks in the at least one edited diagram, the navigating comprising:
        propagating a signal label through the navigable blocks in the at least one edited diagram,
        tracing a non-navigable source and destination of a signal in the at least one edited diagram;
        tracing signal connections that are implied through implicit block connections in the at least one edited diagram; and
        specifying navigability properties for each type of block of the plurality of blocks in the at least one edited diagram by way of an interface for the each type of the block.

20. A non-transitory medium storing machine-executable instructions, that when executed on a processor, cause the processor to:
  receive an executable block diagram model at an editing stage;
  automatically trace a signal connection through one or more navigable blocks in the executable block diagram model during the editing stage; and
  display tracing results in a graphical user interface (GUI) during the editing stage, displaying comprising highlighting the signal connection on the GUI.

21. The medium of claim 20, where the tracing is in response to a user request.

22. The medium of claim 20, further storing instructions that when executed on the processor, cause the processor to:
  display an implied signal connection on the GUI, wherein the implied signal connection is between blocks that are implicitly connected to each other.

23. The medium of claim 20, further storing instructions that when executed on the processor, cause the processor to:
  provide an application program interface (API) for one of the one or more navigable blocks in the block diagram model to specify how navigation occurs between one or more inputs and one or more outputs.

24. The medium of claim 23, where the API further comprises a specification of how navigation occurs between the outputs and the inputs.

25. A non-transitory medium storing machine-executable instructions, that when executed on a processor, cause the processor to:
  provide an executable block diagram model;
  propagate a signal label through one or more navigable blocks in the block diagram model, the signal label being propagated while editing the executable block diagram model and without compiling the executable block diagram model; and
  display the propagated signal label on a graphical user interface (GUI).

26. The medium of claim 25, where the propagating is in response to a user request.

27. The medium of claim 25, further storing instructions that when executed on the processor, cause the processor to:
  display signal labels on an implied signal connection on the GUI, wherein the implied signal connection is between blocks that are implicitly connected to each other.

28. The medium of claim 25, further stores instructions that when executed on the processor, cause the processor to:
  provide an application program interface (API) for a block in the executable block diagram model to specify how navigation occurs between inputs and outputs.

29. The medium of claim 28, where the API further comprises specification of how navigation occurs between the inputs and the outputs.

30. The medium of claim 25 further storing one or more instructions that when executed on the processor, cause the processor to:
  automatically trace a non-navigable source and destination of a signal while editing the executable block diagram without compiling the executable block diagram model.

31. The medium of claim 30, wherein tracing is in response to a user request.

32. A non-transitory medium storing machine-executable instructions, that when executed on a processor, cause the processor to:
  provide an executable block diagram model during an editing stage; and
  display an implied signal connection between blocks that are implicitly connected to each other in the executable block diagram model during the editing stage, the displaying comprising:
    highlighting blocks involved in the implied signal connection.

33. The medium of claim 32, where the displaying is in response to activating a hyperlink provided on a block that is implicitly connected to another block.

34. The medium of claim 32, where the displaying is in response to activating a hyperlink on a dialog of a block that is implicitly connected to another block.

35. The medium of claim 32, where the displaying comprises automatically drawing lines between blocks that have implied signal connections.

36. A system comprising:
a processor executing instructions for:
  receiving an executable block diagram model at an editing stage, and
  automatically tracing a signal connection through one or more navigable blocks in the executable block diagram model during the editing stage; and
a display for:

displaying tracing results in a graphical user interface (GUI) during the editing stage, the displaying:
comprising highlighting the signal connection on the GUI.

37. The system of claim 36 wherein the display further displays an implied signal connection between blocks that are implicitly connected to each other in the executable block diagram model during the editing stage, displaying comprising highlighting blocks involved in the implied signal connection.

38. The system of claim 36 wherein the processor further executes instructions for: propagating a signal label through the one or more navigable blocks in the executable block diagram model, the signal label being propagated while editing the executable block diagram model and without compiling the executable block diagram model.

39. The system of claim 38 wherein the display further displays the propagated signal label on a graphical user interface (GUI).

40. A computer-implemented method comprising:
providing, using a computing device, an executable block diagram model;
propagating a signal label through one or more navigable blocks in the block diagram model, the signal label being propagated while editing the executable block diagram model and without compiling the executable block diagram model; and
providing, using the computing device, an application program interface (API) in the executable block diagram model to identify how navigation occurs between inputs and outputs of the one or more navigable blocks.

41. A non-transitory medium storing machine-executable instructions, that when executed on a processor that when executed on a processor, cause the processor to:
provide an executable block diagram model;
propagate a signal label through one or more navigable blocks in the block diagram model, the signal label being propagated while editing the executable block diagram model and without compiling the executable block diagram model; and
provide an application program interface (API) in the executable block diagram model to identify how navigation occurs between inputs and outputs of the one or more navigable blocks.

42. A system comprising:
a processor executing instructions for:
providing an executable block diagram model;
propagating a signal label through one or more navigable blocks in the block diagram model, the signal label being propagated while editing the executable block diagram model and without compiling the executable block diagram model; and
providing an application program interface (API) in the executable block diagram model to identify how navigation occurs between inputs and outputs of the one or more navigable blocks.

43. A method for supporting analysis of a functional block diagram of a dynamic system, said technique comprising:
displaying a block diagram via a computer-driven graphical user interface (GUI); and
editing the block diagram during an edit phase to produce at least one edited diagram on the GUI, where:
the at least one edited diagram includes a plurality of blocks and one or more lines connecting the plurality of blocks,
the plurality of blocks having types including navigable blocks and non-navigable blocks,
the editing comprising:
navigating signals through the navigable blocks in the at least one edited diagram, the navigating comprising:
propagating a signal label through the navigable blocks in the at leas one edited diagram,
tracing a non-navigable source and destination of a signal in the at least one edited diagram,
tracing signal connections that are implied through implicit block connections in the at least one edited diagram, and
specifying navigability properties for each type of block of the plurality of blocks in the at least one edited diagram by way of an interface for the each type of the block.

* * * * *

UNITED STATES PATENT AND TRADEMARK OFFICE
CERTIFICATE OF CORRECTION

PATENT NO. : 8,560,958 B1  
APPLICATION NO. : 13/161062  
DATED : October 15, 2013  
INVENTOR(S) : Haihua Feng et al.

Page 1 of 1

It is certified that error appears in the above-identified patent and that said Letters Patent is hereby corrected as shown below:

In the Specification

Column 3, lines 13 and 14, delete "block-diagrams" and insert --block-diagram-- in lieu thereof.

Column 4, line 17, delete the second occurrence of "be able to".

In the Claims

Column 11, lines 24 and 25 (Claim 1, lines 18 and 19), delete the "→" before "tracing" and insert a paragraph indentation in lieu thereof.

Column 12, line 41 (Claim 14, line 4), after "each" delete "the".

Column 15, lines 35 and 36 (Claim 41, lines 2 and 3), delete the second occurrence of "that when executed on a processor".

Signed and Sealed this  
Eleventh Day of March, 2014

Michelle K. Lee  
*Deputy Director of the United States Patent and Trademark Office*